Sept. 15, 1970 R. L. BALLARD 3,528,708
SYSTEM FOR MINIMIZING SKIDDING
Filed June 13, 1968 3 Sheets-Sheet 3

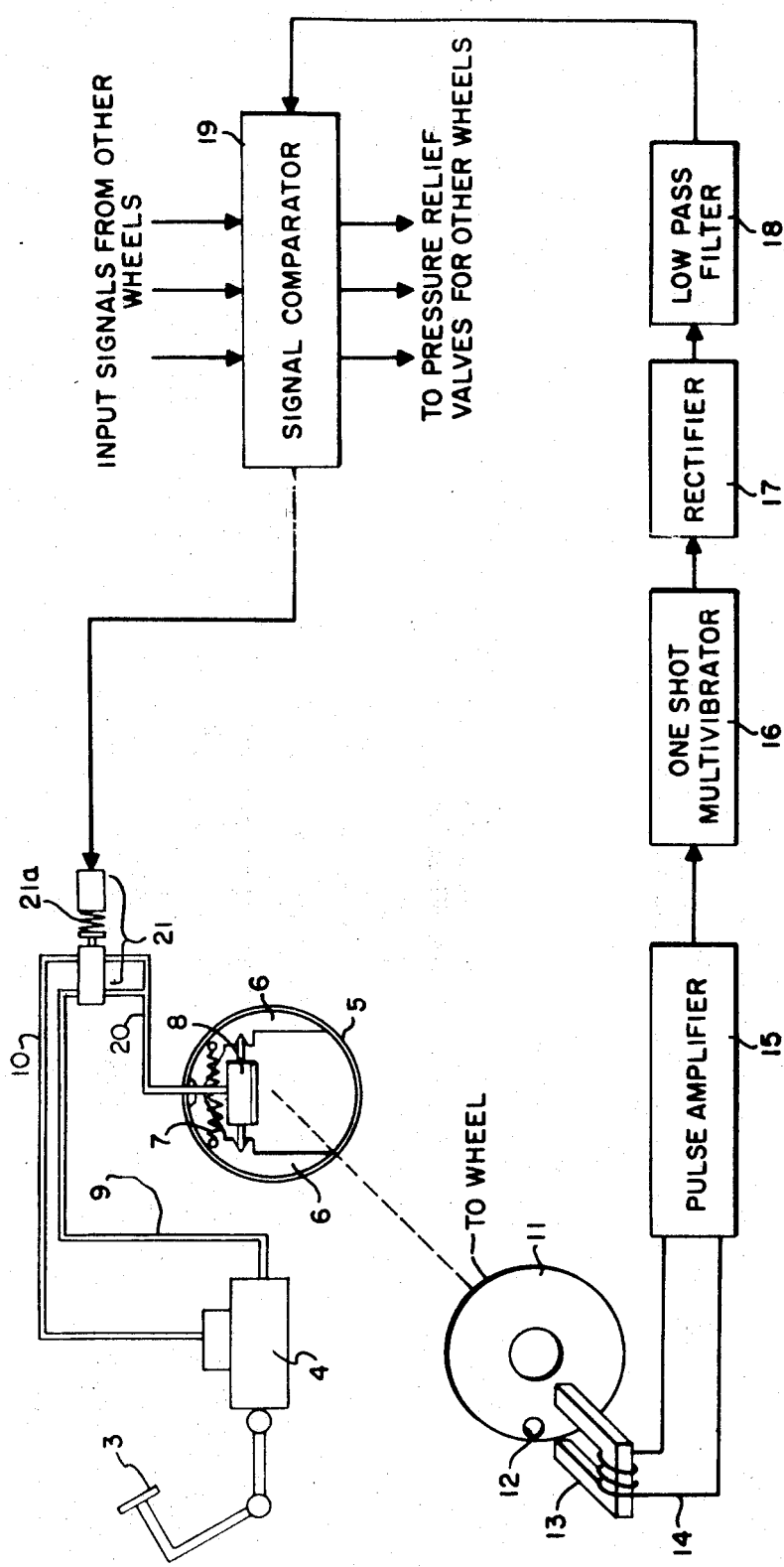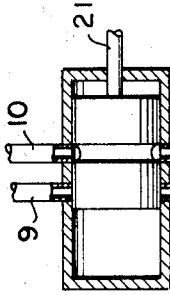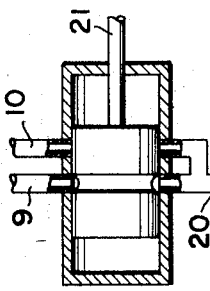

INVENTOR.
ROBERT L. BALLARD
BY *Nacho & Kimmelman*
ATTORNEYS.

United States Patent Office 3,528,708
Patented Sept. 15, 1970

3,528,708
SYSTEM FOR MINIMIZING SKIDDING
Robert L. Ballard, Meadowbrook, Pa., assignor to Hurst-Campbell, Inc., Warminster, Pa., a corporation of Pennsylvania
Filed June 13, 1968, Ser. No. 736,860
Int. Cl. B60t 8/08
U.S. Cl. 303—21                                    8 Claims

ABSTRACT OF THE DISCLOSURE

A plurality of electromagnetic sensing devices are respectively associated with the wheels of a vehicle. Each device produces a signal corresponding to the speed of rotation of its associated wheel. The signals from the wheels are individually compared with the signal derived from the fastest turning wheel to produce respective error signals which are applied to respective pressure release valves in the hydraulic brake lines for the slower turning wheels. Each error signal causes the intermittent release of the pressure on the brake to which it is applied for a constant time interval but at a frequency which varies in response to the magnitude of the error signal.

BACKGROUND OF THE INVENTION

There is a demonstrated need for systems which tend to prevent or diminish skidding of vehicles on ice, wet roads, and the like which occurs when the vehicle operator applies the brakes. The skidding action, which the present system is designed to counteract, results in rotation of the wheels at different velocities despite the application of nominally the same braking pressure to all wheels.

BRIEF STATEMENT OF THE INVENTION

I have found that in the type of skidding just mentioned, the skidding may be halted or diminished by adjusting the brake pressure applied to all wheels. In accordance with the invention, a system is provided for detecting the speed of each wheel, considering the fastest-turning wheel as the reference *non-skidding* wheel, then reducing intermittently the braking pressure on all wheels turning significantly slower than the fastest wheel for respective time intervals which are of constant duration but which recur at respective frequencies which are directly proportional to the difference between the velocity of the fastest wheel and the velocity of each of the slower turning wheels.

BRIEF DESCRIPTION OF THE DRAWINGS

FIG. 1 is a block and schematic diagram of one form of the invention.

FIG. 4 and FIG. 5 are enlarged sectional views of part of the system shown in FIG. 1 in two different operating conditions.

DETAILED DESCRIPTION OF THE INVENTION

Figure 2:
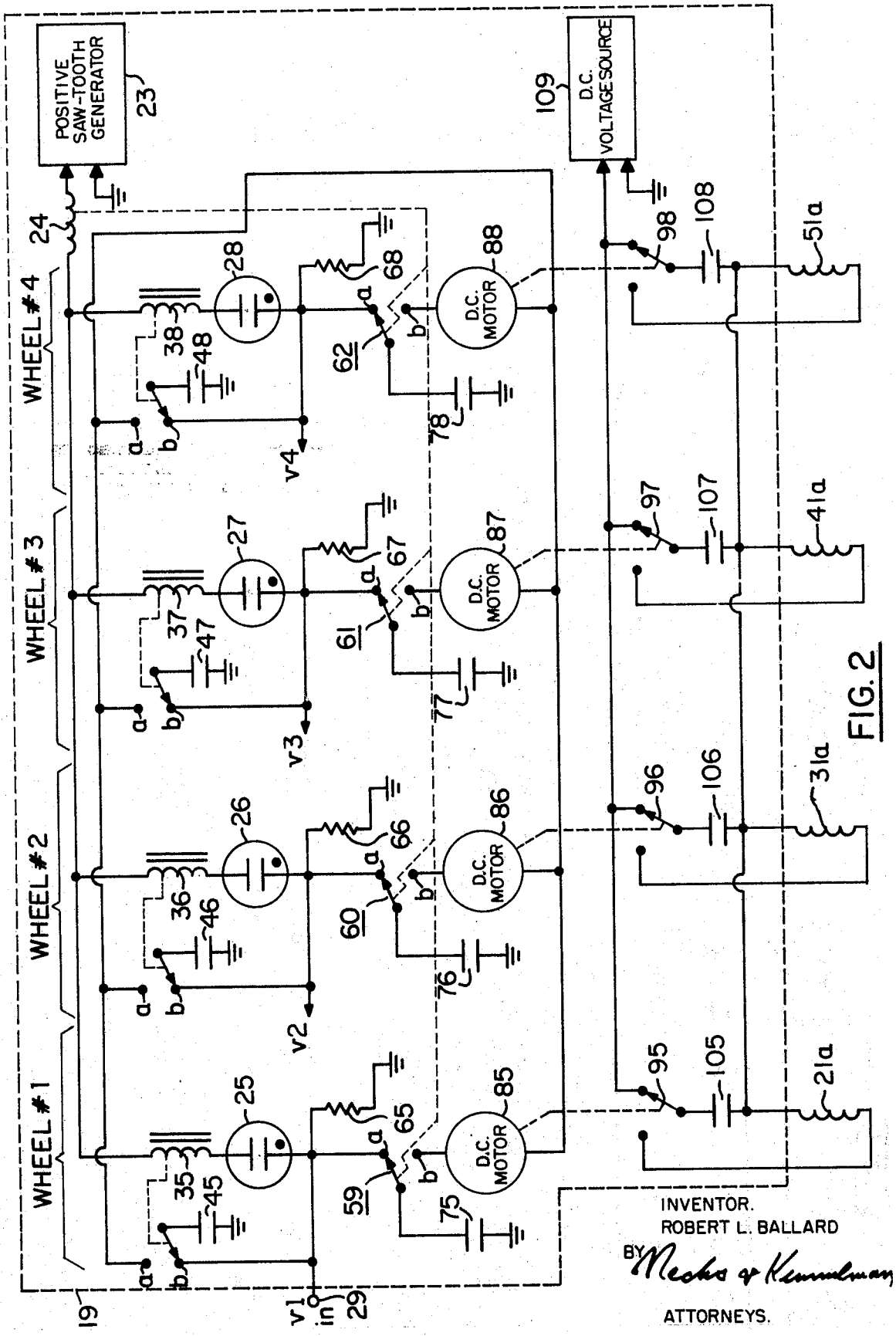
FIG. 2 is a block and schematic circuit diagram of several of the components shown in FIG. 1.

FIG. 1 shows one part of the overall system constructed in accordance with one form of the present invention. Apart from the comparator 19, FIG. 1 illustrates the apparatus for one wheel only, although it should be understood that there would be three other similar arrangements for three other wheels of the vehicle (in the case of a four-wheel vehicle). There is shown the brake drum 5 of one wheel of a vehicle. Also shown are the spring-biased caliper brake shoes 6 which are coupled to the wheel cylinder 8. The wheel cylinder is actuated by the application of hydraulic pressure from the master cylinder 4 through the valve 21 and through hydraulic line 20 when the brake pedal 3 is pressed.

One embodiment of this invention uses disc 11 of magnetic properties attached to the axle of the wheel, having one or more magnetic discontinuities, such as an aperture 12 formed therein. Positioned close to the disc 11 is a permanent magnet 13 around which are wound a number of turns of wire 14 whose ends are connected to the input of a pulse amplifier 15. It will be seen that as the wheel and disc 11 revolve, each time the aperture 12 passes one pole piece of the magnet 13, the flux distribution and intensity of the magnet will change thereby inducing a voltage pulse in the turns 14. This pulse is applied to the amplifier 15 which amplifies it to an amplitude sufficient to initiate the cycle on the one shot multivibrator 16. When the amplified pulses are applied to the input of the multi-vibrator, the latter produces a corresponding series of constant width pulses having a DC level depending upon the B+ voltage and the circuit. These pulses may be AC-coupled to the next stage which therefore sees at its input alternate positive and negative half cycles. The amplitude and width of the half-cycles are determined by the parameters and values of the multivibrator circuit.

The output signal from the multi-vibrator 16 is applied to a rectifier or clipper 17 which extracts only the negative half cycles and applies them to a low pass filter 18. When a train of such negative pulses is applied to this filter, it produces a negative DC output voltage wave which is really an analog signal whose amplitude is directly proportional to the speed of rotation of the associated wheel. This wheel speed signal is applied to one input of a signal comparator 19 whose operation will be explained in detail in connection with FIG. 2 below. It should be noted that the components shown in FIG. 1 ahead of the comparator are merely one form of a system used to derive the wheel speed voltage and can be replaced by equivalent means for producing a tachometer signal.

There are other inputs to the signal comparator 19 from the other wheels of the vehicle and their associated apparatus. The comparator 19 is so constructed that it will compare the signal representing the velocity of the fastest wheel (which is considered to be non-skidding, or skidding less than some of the other wheels) individually with the signal from each other wheel. It will thereupon produce respective error signals for the wheels which indicate the respective differences between the velocity of the fastest wheel and that of each of the other wheels. The comparator produces brake pressure relief pulses which have a constant pulse width but which occur at a frequency which varies directly with the difference between the velocity of the fastest wheel and the particular wheel involved.

These error signal pulses are applied to a solenoid-actuated pressure relief valve 21 which is coupled to the hydraulic lines 9, 10, and 20. Line 10 returns to the fluid reservoir of the master cylinder 4. On each actuation of the valve 21, the armature associated with the solenoid 21a is retracted, thereby allowing the hydraulic pressure in line 20, in the wheel cylinder 8 and on the brake shoe to be at least partly reduced by the diversion of some of the fluid back to the reservoir via line 10 (FIG. 5). At the same time, line 9, is blocked off by the valve (FIG. 5) to prevent any effect on the other hydraulic lines going from master cylinder 4 to the other brakes. As a result of the reduced braking the slipping wheel will tend to speed up to match the speed of the faster turning wheels.

For example, on a 4 wheel vehicle, if it is assumed that wheel 3 has the lowest rotational velocity of all four wheels, its valve corresponding to valve 21 (which is associated with wheel 1) will be actuated by pulses applied thereto which occur at a frequency which is greater than the frequency of the pulses applied to the corresponding valves associated with the faster wheels. Consequently, over a period of time, the slowest wheel will have the least total brake pressure applied to it, the intermediate speed wheels will have somewhat more total brake pressure applied to them, and the pressure applied to the fastest wheel will not be reduced. As a result, the rotational velocities of the wheels other than the fastest wheel will all tend to catch up in speed and thereby diminish or overcome the skidding.

Reference now to FIG. 2, there is shown a schematic diagram for the comparator circuit 19 shown in FIG. 1. The various signals from each of the wheels are applied to respective gas tubes 25, 26, 27 and 28 and simultaneously, via contacts $b$ of relays 35, 36, 37 and 38, to comparison capacitors 45, 46, 47 and 48 thereby charging up the latter to the value of the respective wheel speed signals. Relays 35, 36, 37 and 38 are connected in parallel via a common solenoid 24 to a positive sawtooth generator 23 and their other terminals are connected to the anodes of the gas tubes 25, 26, 27 and 28. The $a$ contacts of these relays are also all connected together and to corresponding terminals of a plurality of DC motors 85, 86, 87 and 88.

Figure 3:
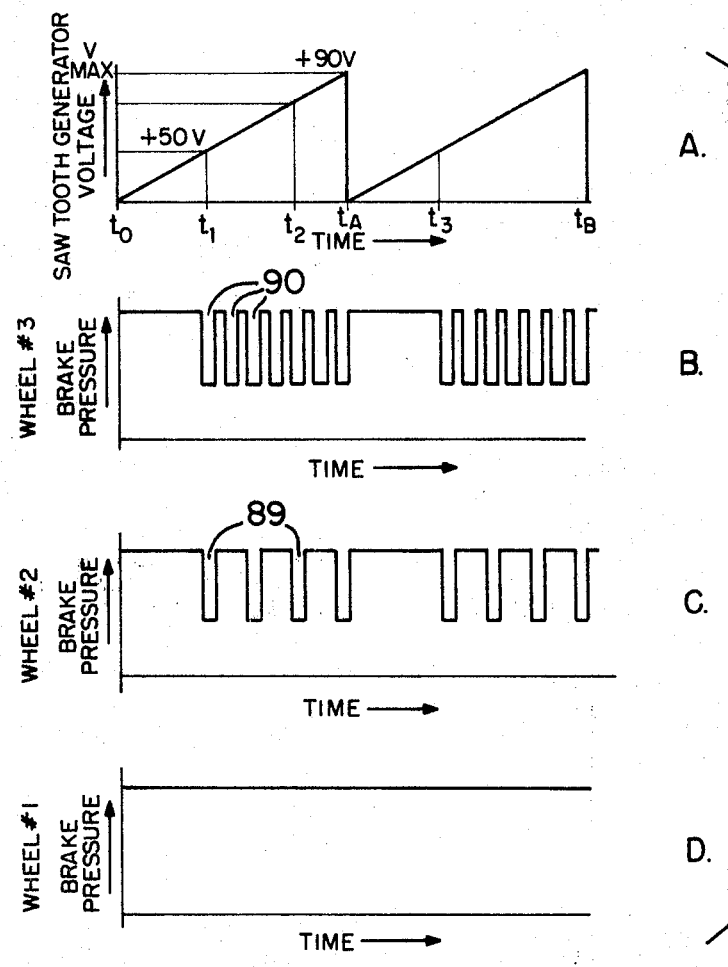
FIG. 3 is a four-part set of graphs depicting the brake pressure release action of the system shown in FIG. 1.

There is applied to the anodes of the tubes 25–28 a positive sawtooth voltage from a generator 23. This generator produces for example, a maximum positive voltage $V_{max}$ and has a period of $t_A$ as shown in part A of FIG. 3.

Wheel 1

Assuming that wheel 1 is rotating at the fastest speed when the brakes are applied and is the non-skidding wheel, the wheel speed voltage $v1$ from wheel 1 which is applied to the terminal 29 from the low pass filter 18 will be $-45$ volts. Assuming further that the gas tubes 25–28 are ignited when there is a voltage difference of 95 volts between their respective cathodes and anodes. Assume further that the $V_{max}$ of the sawtooth is 90 volts. The voltage on the anode of tube 25 rises from time $t_0$ through time $t_1$ until it attains $+50$ volts. Since the wheel speed voltage $v1$ is $-45$ volts and the anode voltage of tube 25 is 50 volts, tube 25 will fire and a large current will be drawn through the solenoid 24 which actuates the arms associated with the two sets of contacts $a$ and $b$ of the switches 59, 60, 61, and 62. The solenoid 24 will switch the arms of these switches from the $a$ to the $b$ contacts so that the motor drive capacitors 75, 76, 77 and 78 will no longer be charged by currents through their associated gas tubes but rather will be connected to the other terminals of the DC motors 85–88. Thus the $-45$ volts stored in the capacitor 75 will be applied to one terminal of DC motor 85.

With the firing of gas tube 25, the solenoid 35 will be actuated so that the $-45$ volts applied at terminal 29 and stored in capacitor 45 will be applied to the other terminals of the motors 85–88. Thus, since both input terminals of the motor 85 will be at $-45$ volts, it will not be energized and will not rotate. Hence, there will be no effect on the position of the switch arm 95 which is electro-mechanically moved as will be seen in conjunction with the explanation of the operation of the circuit with the other wheels. Consequently, the pulsing capacitor 105 remains connected to the DC voltage source 109 and the solenoid 21a of the pressure relief valve 21 is not energized. Thus, there is no relief of the pressure applied by the brake to wheel 1 as shown in part D of FIG. 3.

It is thus seen that there is no action of the pressure relief valve of wheel No. 1 since it is the fastest turning wheel and used as a reference for the other wheels.

Wheel 2

Figure 6:
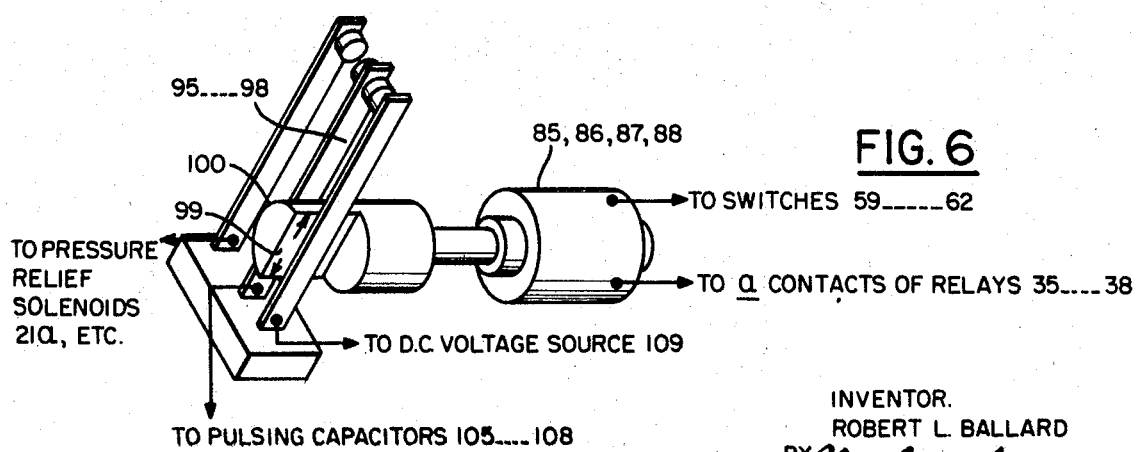
FIG. 6 is an enlarged perspective view of a component of the system shown in FIG. 2.

Now to take the case of wheel 2 at the same time, it will be assumed that the input wheel speed voltage $v2$ is $-20$ volts since it is rotating at a slower speed than wheel 1. The voltage initially applied to the anode of the gas tub 26 through the solenoid 24 was the same as that applied to the tube 25. When tube 25 conducted, however, the voltage drop across the solenoid 24 insured that none of the other tubes 26–28 fires during that particular sawtooth cycle since the requisite minimal ignition potential has not been attained across them. When tube 25 started to conduct, the solenoid 24 was energized as were its associated sets of contacts of the switches 59–62. Since $v2$ is $-20$ volts and was applied through the contact $a$ of switch 60 to the motor drive capacitor 76, the latter will be charged to a potential of $-20$ volts. When solenoid 24 conducts, the arm of switch 60 will move to the $b$ contact position so that the $-20$ volts is applied to one terminal of the DC motor 86. It has already been stated that when tube 25 conducted, the $-45$ volts stored in comparison capacitor 45 is applied via the associated $a$ contact to the other terminals of all the DC motors 85–88. Therefore, motor 86 has a $-45$ potential applied to its upper terminal and the total voltage differential across the motor 86 will be $-25$ volts which will cause it to rotate at a speed proportional to this difference. When the pulsing motor 86 starts to rotate it alternately moves the arm 96 into alternate positions whereby it first disconnects the associated pulsing capacitor 106 from the DC voltage source 109 and connects it in circuit for discharge through the solenoid 31a (that corresponds to the solenoid 21a) which drives the pressure relief valve on wheel 2. After the capacitor 106 has discharged the motor again moves the arm 96 back into contact with the voltage source 109 whereupon the capacitor 106 again becomes charged and discharges on the next alternation of the arm 96. FIG. 6 shows one form that the motor-switch assembly may take for all of the wheel pressure relief subassemblies.

This alternating movement of the switch arm 96 therefore causes the brake pressure on wheel 2 to be intermittently relieved during the time that the capacitor 106 discharges through solenoid 31a. The *width* of the pulse that energizes 31a is a function of the magnitude of the DC voltage stored in the capacitor 106 and the internal resistance of the solenoid 31a. The *frequency* of alternation of the switch arm 96 depends upon the speed of the associated motor 86 which is, in turn, proportional to the voltage difference between the charge on the motor drive capacitor 76 and on the comparison capacitor 46. The width of the pressure relief pulses can be adjusted by providing additional resistance in the circuit of capacitor 106 and solenoid 31a and/or by adjusting the voltage from the source 109. As may be seen from part C of FIG. 3, during the cycle $t0$ to $tA$ there are four pressure release pulses 89 applied to the brake for wheel 2.

Wheel 3

During this same time, it will be assumed that wheel 3 is turning slower than either wheels 1 or 2 and thus its wheel speed voltage $v3$ is only $-10$ volts. In this case, when gas tube 25 fires, the pulsing motor 87 will have impressed across it a voltage differential of $-35$ volts, i.e., $-45$ volts less $-10$ volts, and will rotate faster than pulsing motor 86. This will mean that the switch arm 97 will alternate between its two possible positions at a higher frequency than the switch arm 96 so that the pressure relief pulses 90 as shown in part B of FIG. 3 occur more frequently. However, it should be noted that the width of the pulses 90 is exactly the same as the width of the pulses 89 since all of the pulsing capacitors 105–108 have the same capacity and all of the associated brake pressure release solenoids 21a . . . 51a have the same resistance.

The pulsing action of the switch arms will continue until tube 25 is extinguished by the dropping of the sawtooth voltage at time $t_A$ to a value lower than the extinction potential. During this first sawtooth cycle, the higher the frequency of brake pressure release pulses, the less the average braking pressure applied to that wheel. The end result is that the slower turning or skidding wheels have less total braking pressure applied to them, the pressure being a function of the difference in speed between each of the slower wheels and the fastest turning wheel.

Wheel 4

To complete the picture let us assume that wheel 4 is not skidding but is rotating at essentially the same speed as wheel 1. In this case, the input wheel speed voltage $v4$ will be —45 volts, the same as $v1$. Since it is very unlikely that tubes 25 and 28 could fire simultaneously, it will be assumed that tube 25 fires first despite the same voltage being applied across them. In this case, the input wheel speed voltage $v4$ amounting to —45 volts is stored in the motor drive capacitor 78 and is applied to the pulsing motor 88 when the solenoid 24 is energized. Since —45 volts appears at both terminals of the DC motor, it will not rotate and there will be no pressure-relieving pulses generated and applied to the relief valve of wheel 4 as may be seen by reference to part D, FIG. 3.

GENERAL REMARKS

The circuit of FIG. 2 includes a plurality of current-limiting resistors 65, 66, 67 and 68 provided in the respective cathode circuits of the gas tubes to limit the current through the gas tube.

There are normal differences in the velocities of the wheels which do not require the corrective action of this system. For example, when a vehicle is making a turn, the inside and outside wheels are traveling at different speeds. Also, if the tire diameters are not exactly equal due to differences in tread wear or inflation, the wheel velocities also differ. Therefore the system may be designed so that the respective DC motors do not come into play until a predetermined voltage across them has been exceeded. The magnitude of the voltage required to initiate rotation of the motor is determined in part by the "break-away" friction inherent in the mechanical characteristics of the motor and its associated cam and spring system. As illustrated in FIG. 6, if it is desired to increase the minimum voltage across the motor that is sufficient to overcome the break-away friction, the length 99 of the land of the cam 100 would be increased. The longer the land on the cam (within limits), the more initial voltage is required to start the motor rotating. Similarly, if the switch arms 95 . . . 98 are made stiffer, more voltage will be required to start the motor rotating and vice versa.

It is evident that other ways of producing the analog voltage from each wheel are also possible. For example, a permanent magnet could be mounted on the edge of a disc which rotates with the wheel. The disc would pass through a winding thereby inducing a pulse therein for each revolution. If a DC tachometer is substituted for components 12 through 18 the analog voltage will be directly derived but this may be a relatively costly alternative. This alternative also has the disadvantage of employing many more moving parts than the predominantly electrical form shown in FIG. 1.

It should be borne in mind that this system is not intended to overcome all types of skidding. For example, it will not be effective when skidding occurs during the time that all four wheels are rendered immobile by the brakes. Nor will it be effective in the case of strictly sideways skidding. The present system is not sensitive to yaw but essentially only to forward motion of the wheels.

Also, the gas diodes can naturally be supplanted by their solid state equivalents. The electromechanical switch shown in FIG. 6 may similarly take any number of forms, either electromechanical electronic or electro-optical to name a few.

What is claimed is:

1. A system for equalizing the rotational velocity of a plurality of rotating members each of which is associated with a braking means, comprising:
   (a) means for sensing differences in the rotational velocities of selected ones of said members with respect to the rotational velocity of a reference one of said members, said (a) means including means for producing signals in response to said sensed differences and corresponding thereto, and
   (b) means responsive to said signals for producing sets of constant width, variable frequency pulses and applying them to adjust the magnitude of the braking action exerted by the respective braking means associated with said selected members, said pulses being applied to effect an intermittent reduction in the braking action applied by said respective braking means to their associated members for constant intervals of time, the frequency of said reductions being a direct function of the magnitude of said sensed differences.

2. The system according to claim 1 wherein said braking action is pressure against said selected members.

3. The system according to claim 1 wherein said reference member is the member which rotates at the highest velocity relative to the velocity of said selected ones of said members.

4. The system according to claim 3 wherein said rotating members are the wheels of a vehicle, wherein said (a) means includes means respectively associated with each of said wheels for producing a wheel speed analog signal indicative of the rotational velocity of said wheel and further wherein said (b) means includes:
   (i) means for comparing the analog signal from the wheel rotating at the highest velocity with the respective analog signals from said selected ones of said wheels thereby to derive a plurality of error signals, said error signals having respective magnitudes which are inversely proportional to the magnitudes of said corresponding analog signals, and
   (ii) means coupled to each of said braking means for said selected ones of said wheels for intermittently reducing the pressure thereof against said wheels in response to respective ones of said error signals.

5. The system according to claim 4 wherein said (a) means includes:
   (i) magnetic rotating members attached to or part of each of said wheels, each member including a discontinuity formed therein,
   (ii) a plurality of magnets respectively mounted in proximity to said members,
   (iii) a plurality of turns of a conductor wound around each of said magnets and in which voltage pulses are induced when said discontinuities pass said magnets, and
   (iv) means responsive to said voltage pulses for producing electrical analog signals, said means including means responsive to said voltage pulses for producing unipolar pulses of constant amplitude and width and means for integrating said unipolar pulses.

6. The system according to claim 4 wherein said (i) means includes:
   (1) a plurality of variable conductive devices to which said analog signals are respectively applied,
   (2) a plurality of switching means associated with respective ones of said conductive devices, each of said switching means being coupled to one of said (ii) means for intermittently enabling energization of the latter in a predetermined switching state, and
   (3) means responsive to the onset of conduction through the one of said variable conductive devices to which the analog signal corresponding to the fastest turning wheel is applied for causing all of said analog signals to be applied to respective ones of said switching means, said (3) means also simultaneously causing the fastest wheel analog signal to be applied to all of said switching means.

7. The system according to claim 6 wherein said (i) means additionally includes means for applying a triangular wave signal simutaneously to all of said (1) devices, wherein said (2) switching means includes a plurality of DC motors to which said analog signals are applied and a corresponding plurality of associated single pole, double-throw switches respectively coupled to said braking means, the arms of said switches being driven alternately to opposite throw positions by said DC motors when said (3) means is operative, the frequency of said throws being a direct function of the magnitude of the difference between the analog signals applied to the respective DC motors.

8. The system according to claim 7 wherein there are a plurality of signal storage means respectively coupled to said arms, wherein a DC voltage is applied to all of said signal storage means in a first throw position of said switch arms, and wherein said DC voltage is not applied to all of said storage means and said stored DC signals are discharged from said storage means in a second throw position of said arms thereby creating signal pulses applied to said asociated braking means.

References Cited

UNITED STATES PATENTS

| | | | |
|---|---|---|---|
| 2,788,186 | 4/1957 | Wilson | 303—21 X |
| 3,245,213 | 4/1966 | Thompson et al. | 303—21 |
| 3,260,555 | 7/1966 | Dacker | 303—21 |

TRYGVE M. BLIX, Primary Examiner

J. J. McLAUGHLIN, Jr., Assistant Examiner

U.S. Cl. X.R.

188—181; 303—6